Figure 1:
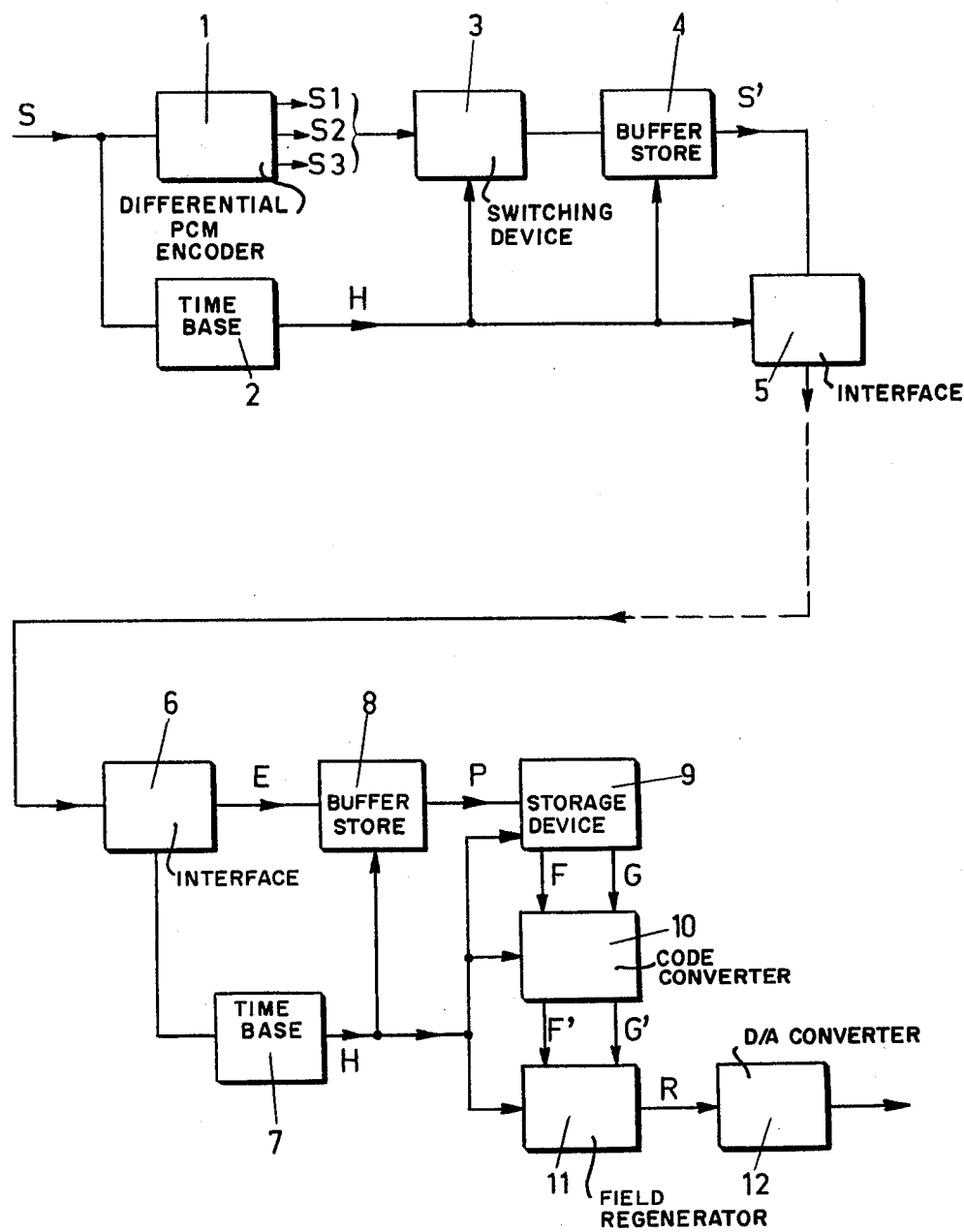

United States Patent [19]

Devimeux et al.

[11] 4,060,832
[45] Nov. 29, 1977

[54] DIGIT RATE REDUCING METHOD IN VIDEO SIGNAL TRANSMISSION

[75] Inventors: Daniel Pierre Yvon Devimeux; François-Xavier Antoine Stouls, both of Perros Guirec, France

[73] Assignee: Societe Anonyme de Telecommunications, France

[21] Appl. No.: 698,833

[22] Filed: June 23, 1976

[30] Foreign Application Priority Data

July 3, 1975 France .................................. 75.20864

[51] Int. Cl.$^2$ ............................................... H04N 7/12
[52] U.S. Cl. .................................................. 358/133
[58] Field of Search ........................ 358/85, 133, 260

[56] References Cited

U.S. PATENT DOCUMENTS

| | | | |
|---|---|---|---|
| 3,051,778 | 8/1962 | Graham | 358/133 |
| 3,366,739 | 1/1968 | Parkinson | 358/133 |
| 3,715,483 | 2/1973 | Limb et al. | 358/133 |

Primary Examiner—Richard Murray
Attorney, Agent, or Firm—Jacobs & Jacobs

[57] ABSTRACT

A digit rate reducing method in the transmission of video-telephone signals, wherein each frame is scanned by means of two consecutive fields comprising each the lines of same parity, each frame dot being represented by a word of $n$, in particular 3, binary digits comprising transmitting a frame every three frames, storing a frame of each parity at the receiving equipment in a frame storage device, systematically freshening-up a stored frame by the next transmitted frame of same parity, and regenerating intermediate frames by interpolating between the stored frames, further comprising forming a pseudo-field $I_n$ with opposite parity to a stored field $T_n$ by interpolating between $T_n$ and the stored field $T_{n+3}$ or $T_{n-3}$, and regenerating an intermediate field $T_{n+1}$ or $T_{n-1}$ from $I_n$ and $T_{n+3}$ or $T_{n-3}$, respectively.

4 Claims, 5 Drawing Figures

DIGIT RATE REDUCING METHOD IN VIDEO SIGNAL TRANSMISSION

The present invention relates to the digit transmission of animated pictures involving a high transmission rate, such as television or video-telephone pictures, and is more particularly concerned with a process for reducing the digit rate which provides on reception pictures of a quality close to that of the original pictures.

A conventional digit rate reducing system consists in alternate interlacing sweeps. This system consists in a field scan of half of the frame by sweeping every alternate line and using the second field to scan the other half of the frame by sweeping the unexplored lines of opposed parity left aside during the first operation. In such a system where the field frequency is 50 Hz, i.e. a frame frequency of 25 Hz, the bandwidth needed for the transmission can be divided in half, thus avoiding flickers to appear when consecutive illuminations of a dot take place at time intervals of over 20 ms, i.e. a frequency lower than 50 Hz.

Irrespective of the field frequency, various systems have been forwarded to reduce the digit rate through time sub-sampling. All these systems utilize at the receiving equipment a frame storage device the content of which is freshened-up according to various methods.

One of these methods consists in freshening-up one frame dot out of $n$, so that after $n$ frame periods, all the dots have been freshened-up. A frame visualized at a rate identical to the initial rate comprises 100%/$n$ fresh dots, while the other dots have not been freshened-up. Such a method however produces highly degraded contours when the camera operates quick sweeping motions (travelling shots) or when the focal length undergoes quick changes (zooms).

Another method consists in transmitting one frame only out of $n$ and to repeat $n$ times the transmitted frames; but such a method will restitute the moving contours in jerks.

The object of the invention is a digit rate reducing method in the transmission of interlaced video fields which enables the pictures restituted at the receiving terminal to offer a quality close to that of the original pictures.

The method of the invention, comprising a transmitting frame every three frames, storing a frame of each parity at the receiving equipment in a frame storage device, systematically freshening-up a stored frame by the next transmitted frame of same parity, and regenerating intermediate frames by interpolating between the stored frames, further comprises forming a pseudo-field $I_n$ with opposite parity to a stored field $T_n$ by interpolating between $T_n$ and the stored field $T_{n+3}$ or $T_{n-3}$, and regenerating an intermediate field $T_{n+1}$ or $T_{n-1}$ from $I_n$ and $T_{n+3}$ or $T_{n-3}$, respectively.

Advantageously, for the calculation of one dot X of the pseudo-field $I_n$, dot B of field $T_{n+3}$ or $T_{n-3}$ corresponding to dot X is compared with dots A and C belonging to the adjacent lines of field $T_n$ which are nearest to dot B, and there is chosen for X:

the value of dot B when comprised between the values of dot A and C, and the value of A or C which is nearest to that of dot B, when the latter is greater or smaller than the values of A and C.

The regeneration-procedure of th invention of the intermediate fields provides an excellent rendition of the movement in the case of animated pictures, as well as a three to one digit rate reduction.

The method of the invention applies to interlaced video-telephone frames as well as to interlaced television frames.

Figure 2:
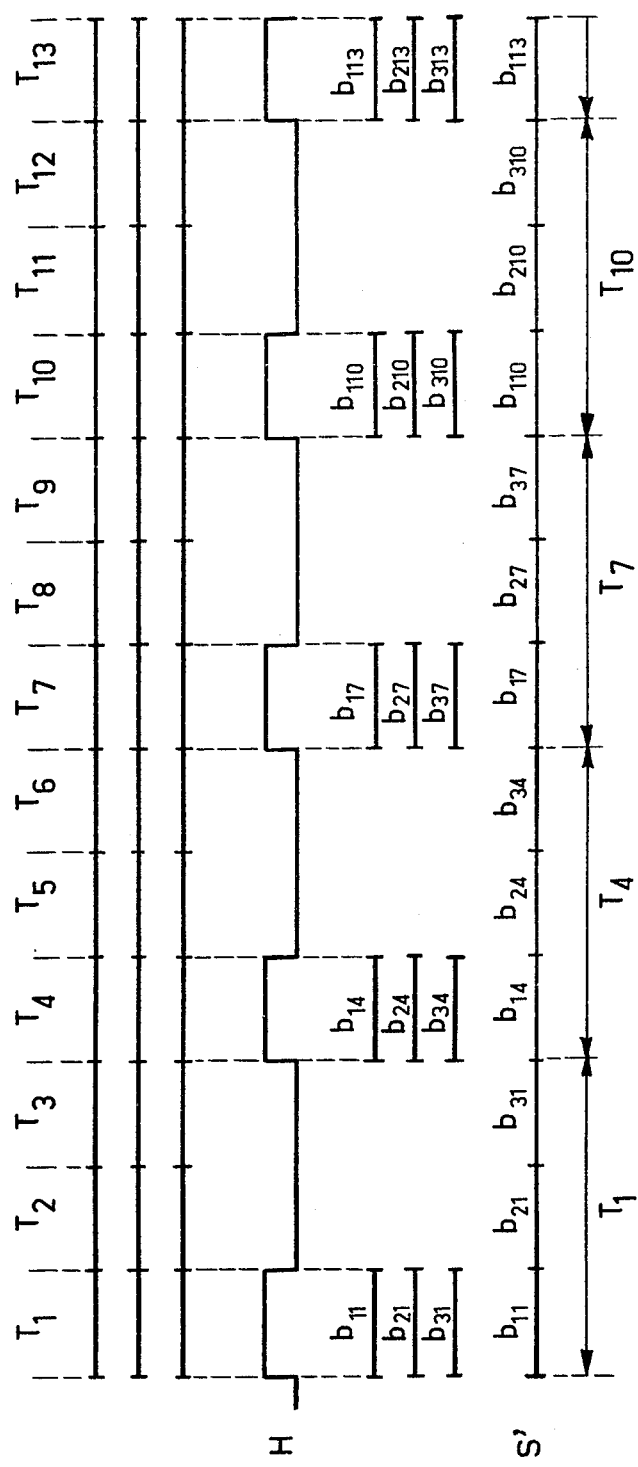
Figure 3:
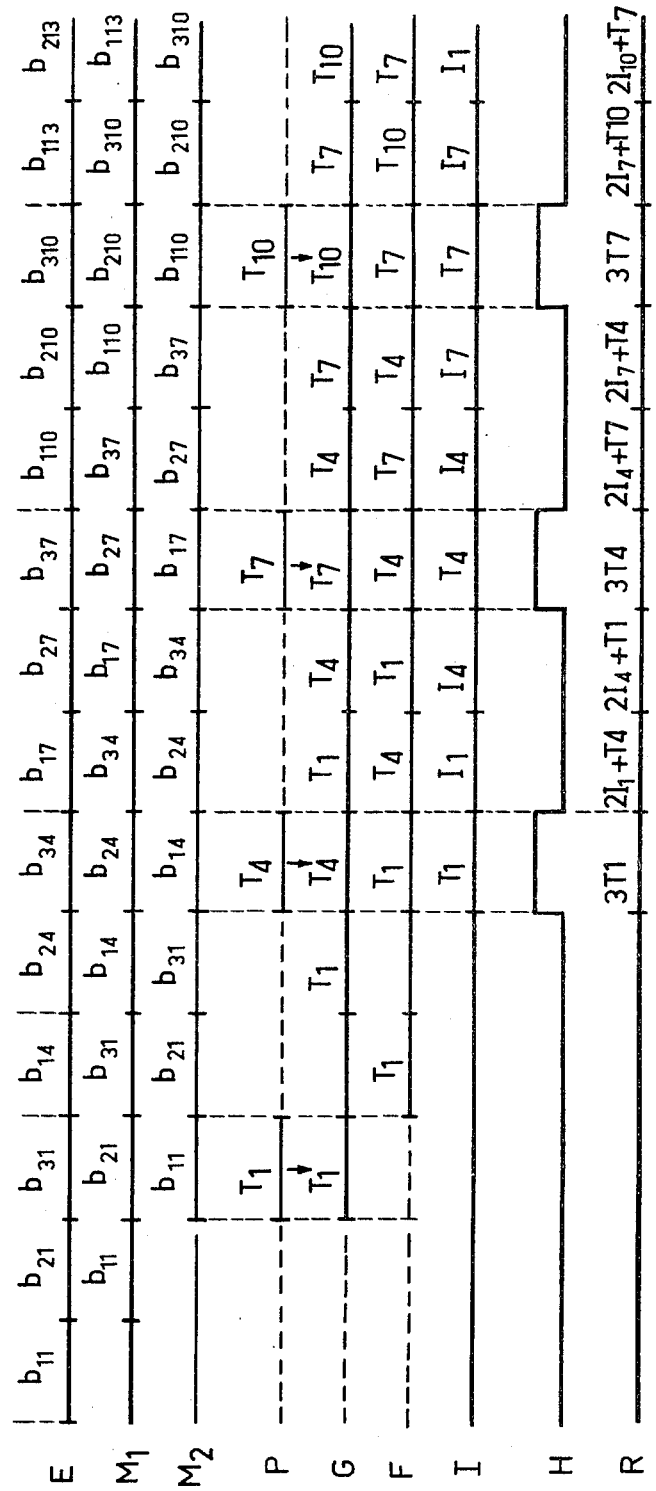
Figure 4:
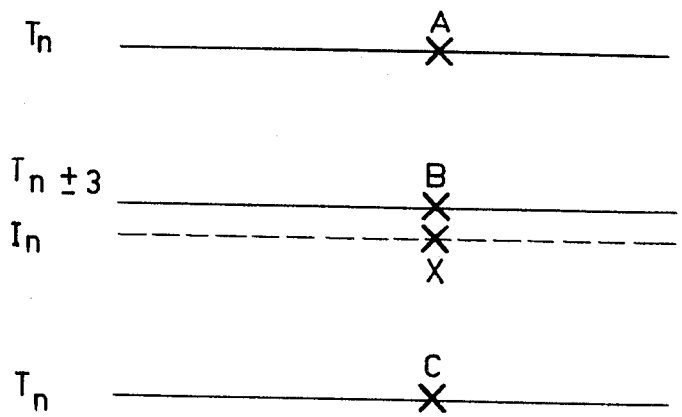
Figure 5:
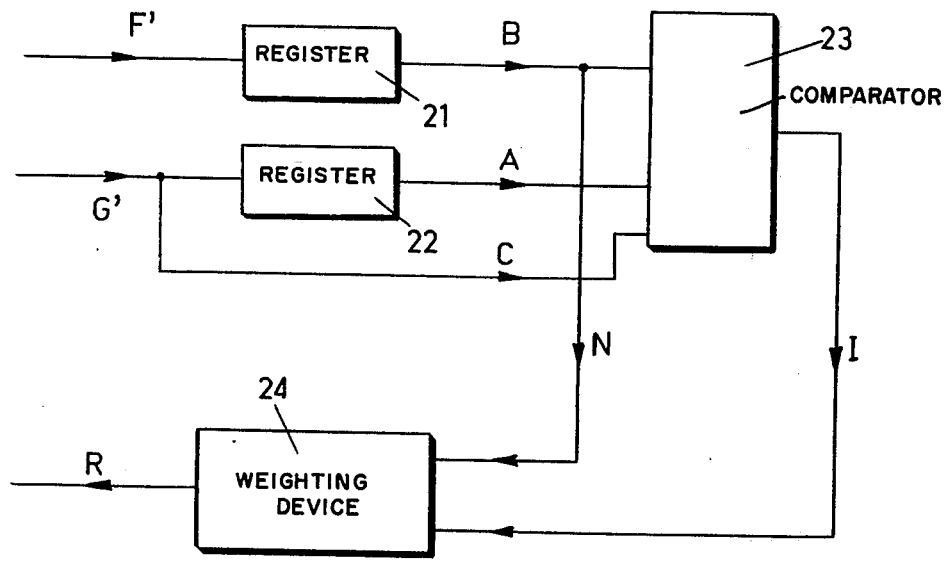

The invention will be better understood from the following description, with reference to the annexed drawings, in which FIG. 1 shows a block diagram of a device for performing the method of the invention, FIG. 2 is a timing chart at the transmitting equipment, FIG. 3 is a timing chart at the receiving equipment, FIG. 4 is a representation of the pseudo-field generating procedure, FIG. 5 is a block diagram of the pseuodo-field generating device.

On FIG. 1 are represented essential pieces of equipment involved in the method of the invention. When transmitting, the video signal S is applied to a delta type differential encoder 1 at the rate of a time base 2, then time sub-sampled in a switching device 3 and fed to a buffer storage device 4 delivering an S' signal. A device 5 of known type adapts signal S' to the transmission channel under consideration by inserting into said S' signal a synchronizing word and putting it in a form adapted to the transmission.

FIG. 2 brings precisions to the nature of the signals being processed according to the method of the invention. Encoder 1 achieves a pulse code modulation (PCM) of the delta dot-line type and delivers for each frame dot three binary digits transmitted in parallel. The time sub-sampling drive device H allows only one field out of three to be written in the buffer storage device. Thus, only the binary digits of fields $T_1, T_4, T_7, T_{10}\ldots$ are written in buffer store 4 shown in FIG. 1. Reading of buffer store 4 is made with different period delays for the three binary digits of each written field. The first binary digit $b_1$ is transmitted during the first field period, the second binary digit $b_2$ during the second field period and the third binary digit $b_3$ during the third field period. The cycle starts again with the fourth field. Signal S' is the signal delivered by buffer store 4. A parallel bit transmission along three channels at a rate of 3 × 2.048 Mbauds is thus converted into a series transmission at the rate of 2.048 Mbauds in the case of video-telephone for which a dot would, after encoding, be represented by three binary digits.

FIG. 1 represents also the essential pieces of equipment at the receiving equipment of a signal at a rate of 2.048 Mbits/s. A device 6 of known type carries out the reverse operations to those made by device 5. The signals obtained are transmitted to a buffer storage device 8 according to the rate delivered by a time base 7. The signal from buffer store 8 is transmitted to a main storage device 9 of capacity equal to one frame, i.e. two fields.

A digital code converter 10 converts the differential PCM signals F and G from buffer 9 and delivers them in PCM to a device 11 for regenerating the non transmitted fields, as will be described in detail hereafter. Finally, an analog-to-digital converter permits visualization of the transmitted frame.

FIG. 3 clarifies how the signals are processed at the receiving equipment.

Signal E represents the series signal available at the input of buffer store 8. This buffer store comprises two registers $M_1$ and $M_2$ (not shown) and can therefore deliver two signals with respective lag corresponding to the period of one and two fields. This buffer store will therefore restitute the three binary digits $b_{1i}$, $b_{2i}$, $b_{3i}$ in parallel during a field $T_j$. Signal P received at the output of buffer 8 serves as a refresher for the main store 9 whose capacity is one frame, i.e. two fields.

Store 9 comprises two delay lines (not shown) looped onto each other, the output signals of which are signals F and G showed in FIG. 3. It is apparent from this figure that a given field, for instance $T_1$, is alternatively present in F and G until freshening-up by the transmitted following field of same parity, i.e. field $T_7$, occurs, signal F thus deriving from signal G through the time lag of one field. It can also be said that if signal G represents field $T_n$ of a given parity, signal F represents at the same moment the registered field of opposite parity which can be :

either $T_{n+3}$ during the field period following storing of a fresh field (signal P delayed by one field), or $T_{n-3}$ during the two following fields.

In order to avoid backward moves in reading the fields (e.g. $T_1$ after $T_4$), the signal emitted by the main storage device 9 is filtered through generating a pseudo-field $I_n$ by interpolation between the stored fields and by using this pseudo-field $I_n$ to regenerate the non transmitted fields $T_2$, $T_3$, $T_5$, $T_6$, etc.

FIG. 4 represents the generation of a pseudo field $I_n$ from stored fields $T_n$, $T_{n-3}$ or $T_{n+3}$. A dot X of said pseudo-field $I_n$ of opposite parity to $T_n$ is calculated from dots A and C of the proximate lines of $T_n$ located above or under X, and from dot B corresponding to X in the adjacent field of the same parity as $I_n$, that is as the case may be in $T_{n-3}$ or $T_{n+3}$ (signal F).

The amplitude of B is compared to that of A and C. If B is comprised between A and C, the area is a motionless area, and X is chosen equal to B. If B is greater or smaller than A and C, it is considered that a movement has taken place and X is given the value of A or C which is nearest to B.

The device for generating the pseudo-field $I_n$ is shown in FIGS. 1 and 5, FIG. 5 representing the device 11 of FIG. 1 in more detailed manner. Both PCM signals F' and G' from code converter 10 are delayed by half a line, one line and 0 line in registers 21 and 22. Dot B is a derived from signal F' delayed by one-half line and is found therefore on a field line of parity opposite to $T_n$.

Point A is derived from a signal G' displaced to next line. Finally point C is derived from the unchanged G' signal. A comparating device 23 allows point B of field $T_{n+3}$ or $T_{n-3}$ to be compared with points A and C of the lines adjacent to field $T_n$. Comparator 23 supplies point X belonging to pseudo-field $I_n$.

Signal I obtained at the output of comparator 23 is formed therefore by the transmitted fields $T_n$, $T_{n+3}$, etc. and by the pseudo-fields $I_n$, $I_{n+3}$ . . . according to the following sequence:

$T_n$ during the first field

Ihd n during the second field $I_{n+3}$ during the third field.

$T_{n+3}$ during the fourth field . . .

For regenerating the non transmitted fields $T_{n+1}$ or $T_{n-1}$, pseudo-field $I_n$ is weighted with signal N corresponding to dot B, so as to obtain the signal R of FIG. 3.

This signal R is equal to $T_1$ during the first field, to $\frac{2}{3} I_1 + T_4$ during the second field, to $\frac{1}{3} T_1 + \frac{2}{3} I_4$ during the third field, to $T_4$ during the fourth field, etc.

With this process, it is possible to take into account the initial frame resolution; thus, a static frame is rendered with a resolutin very close to the original one and a dynamic frame is rendered with a good approximation of the movement. A kind of "cross-fade" is obtained on the visualized picture and discontinuities due to backward moves are avoided.

To achieve this weighting, signals I and N are applied to a sequential weighting device 24. This device 24 is essentially made of a digital adder which multiplies signal $I_n$ buy 2 and signal N by 1, and then makes the operations 3 × N during one field and 2 N + $I_n$ during the next two fields The signal R thus obtained is thereafter converted in 12 into an analog signal and finally visualized on a terminal equipment.

This method, involves only few means for its performance since the frame storage device is already present at the receiving equipment of known devices.

This method allows a signal to be rendered with little tangibleloss of resolution of the static frame while filtering dynamic parts.

The present description has been made with relation to the particular case where one dot as represented by three binary digits, and one field was transmitted every three frames. This made it possible for instance for the transmission of a video-telephone frame, to obtain a transmission rate of 2.048 Mbits/s. But such a method can be applied to the time sub-sampling of interlaced television frames and allows in the same way a sub-sampling of one field ever (2p+1) fields to be achieved.

What we claim is:

1. A digit rate reducing method in the transmission of video-telephone signals, wherein each frame is scanned by means of two consecutive fields comprising each the lines of same parity, each frame dot being represented by a word of n, in particular 3, binary digits comprising transmitting a frame every three frames, storing a frame of each parity at the receiving equipment in a frame storage device, systematicaly freshening-up a stored frame by the next transmitted frame of same parity, and regenerating intermediate frames by interpolating between the stored frames, further comprising forming a pseudo-field $I_n$ with opposite parity to a stored field $T_n$ by interpolating between $T_n$ and the stored field $T_{n+3}$ or $T_{-3}$, and regenerating an intermediate field $T_{n+1}$ or $T_{n-1}$ from $I_n$ and $T_{n+3}$ or $T_{n-3}$, respectively.

2. A method according to claim 1 wherein for the calculation of a dot X of pseudo-field $I_n$, dot B of field $T_{n+3}$ or $T_{n-3}$ corresponding to dot X is compared to dot A and C belonging to adjacent lines of field $T_n$ which are nearest to dot B, and wherein either the value of dot B when comprised between the values of dots A and C, or the value of A or C which is nearest to that of dot B when the latter greater or smaller than the values or A and C, is chosen for X.

3. The method according to claim 1, wherein in order to obtain the intermediate field $T_{n+1}$ or $T_{n-1}$, one forms $\frac{1}{3} (2I_n + T_{n+3}$ or $T_{n-3})$.

4. The method according to claim 2, wherein in order to obtain the intermediate field $T_{n301}$ or $T_{n-1}$, one forms $\frac{1}{3} (2I_n + T_{n+3}$ or $T_{n-3})$.

* * * * *